W. S. MATTHEWS.

LOOSE SHEET TABLET.

APPLICATION FILED SEPT. 9, 1916.

Reissued Dec. 12, 1916. 14,229.

Inventor,
William S. Matthews
By Bakewell & Church Attys.

THE NORRIS PETERS CO., PHOTO LITHO., WASHINGTON, D. C.

UNITED STATES PATENT OFFICE.

WILLIAM STUART MATTHEWS, OF ST. JOSEPH, MISSOURI.

LOOSE-SHEET TABLET.

14,229. Specification of Reissued Letters Patent. Reissued Dec. 12, 1916.

Original No. 1,184,976, dated May 30, 1916, Serial No. 51,711, filed September 20, 1915. Application for reissue filed September 9, 1916. Serial No. 119,306.

*To all whom it may concern:*

Be it known that I, WILLIAM STUART MATTHEWS, a citizen of the United States, residing at St. Joseph, Buchanan county, Missouri, have invented a certain new and useful Improvement in Loose-Sheet Tablets, of which the following is a full, clear, and exact description, such as will enable others skilled in the art to which it appertains to make and use the same.

This invention relates to writing tablets, and has for its main object to provide a writing tablet in which the sheets are free from glue or gum such as is generally used in writing tablets to bind the sheets together.

Another object is to provide a loose sheet tablet which is so constructed that it can be used as conveniently as a tablet of the kind now in general use, namely, a tablet in which the sheets are permanently connected together by an adhesive.

To this end I have devised a tablet that consists of a pile of loose sheets of paper, and a supporting device for the sheets that holds them in superimposed relation without obstructing the hand or wrist of the person writing on the top sheet of the pile, the complete tablet preferably comprising a part that protects the top sheet of the pile when the tablet is not in use. The device that supports the sheets of paper and prevents them from shifting laterally out of vertical alinement with each other comprises a flat member on which the pile of sheets rests and a means on said flat member that projects upwardly therefrom at substantially right angles to the sheets, so as to coöperate with the edges of the sheets to hold them in proper position. In the form of my invention herein illustrated said device consists of a box which is so constructed that there are no parts on the lower right hand corner portion of same that will interfere with the hand or wrist of the person writing on the tablet, but I wish it to be understood that my broad idea is not limited to a loose sheet tablet comprising a means of the character referred to for supporting the sheets and holding them in proper position.

Figure 2:
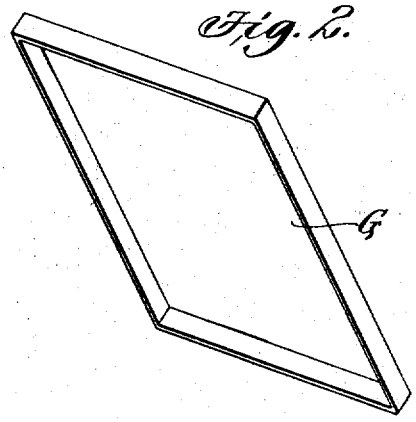
Figure 3:
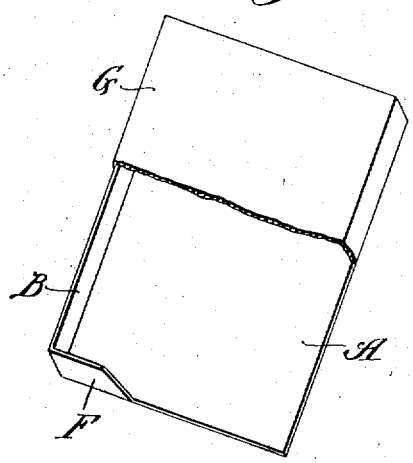
Figure 1:
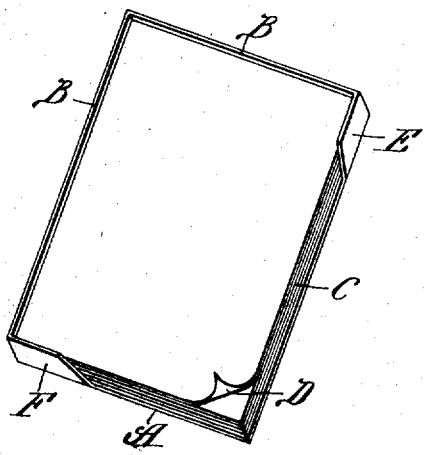

Figure 1 of the drawings is a perspective view of a loose sheet writing tablet constructed in accordance with my invention, the lid of the box being removed. Fig. 2 is a perspective view of the lid; and Fig. 3 is a perspective view of the complete box, partly broken away and with the sheets removed.

Referring to the drawings, which illustrate one form of my invention, A designates the bottom of the box, C designates loose sheets of writing paper that are arranged on the bottom of the box in superimposed relation, so as to form a pile, and B designates flanges that project upwardly from the bottom A at one side and at one end of same, so as to form part of the rim or sides of the lower part of the box that contains the sheets of paper C. The remainder of the rim is formed by two short extensions E and F of the flanges B, which extensions are arranged diagonally opposite each other at the upper right hand corner and the lower left hand corner, respectively, of the bottom A, as shown in Fig. 1. By forming the lower part of the box in this manner, namely, forming one side and one end of the box complete and omitting portions of the other side and end, I produce a box that will hold the sheets of paper C in proper position and still not obstruct the hand or wrist of the person writing on the top sheet of the pile. Still another desirable feature of such a box is that the top sheet of the pile can be removed easily by grasping the lower right hand corner of same, as indicated by the reference character D in Fig. 1.

The greatest dimension of the box can extend in a horizontal direction, instead of in a vertical direction, as herein shown; the box can be constructed to adapt it to a left hand person; and it can be provided with any other suitable kind of a lid or cover in place of the telescoped lid herein shown.

A loose sheet tablet of the construction above described can be used as conveniently as a writing tablet of the kind now in general use; the sheets of same are free from glue or gum; there is no liability of tearing a sheet during the operation of removing it from the tablet and the sheets are completely incased and protected when the tablet is not in use.

Having thus described my invention, what I claim. and desire to secure by Letters Patent, is:

1. In a device of the kind described, the combination of loose sheets of paper and a box and a telescopic lid, a bottom, one end and one side of the bottom of the box being complete, and portions of the other side and end cut away to prevent interference with the hand and wrist when writing on the tablet.

2. A device of the kind described, comprising a box with a solid bottom and a telescopic lid, one side and one end being complete, and diagonally opposite sections on the other side and end to prevent the sheets from slipping out of the box.

3. A device of the kind described, comprising a shallow box having a solid bottom, one side and one end, the corresponding opposite side and end consisting of short, extensions leaving an open space from extension to extension, and the sheets held in position therein.

4. A device of the kind described, comprising the bottom and a side and one end of the rim of a box, diagonally opposite extensions of the rim on the other side and end of the box, loose sheets of paper fitted in said box, and a loose lid to close the top, sides and ends of the box.

5. A loose sheet tablet composed of a pile of loose sheets of paper, and a supporting device for said pile provided with means that holds the sheets in alinement and prevents them from moving horizontally in any direction off said supporting device without interfering with the hand or wrist of the person writing on the tablet.

6. A loose sheet tablet, comprising a pile of loose sheets of paper, a flat member on which said pile rests, and upwardly projecting devices on said member arranged in such a manner that they coöperate with the edges of said sheets to hold them in vertical alinement with each other and prevent them from moving horizontally in any direction off said flat member without obstructing the hand or wrist of the person writing on the top sheet of the pile.

7. A loose sheet tablet composed of a pile of loose rectangular sheets of paper, a flat member on which said pile rests, and means on said member that embrace only three corners of the pile so as to hold the sheets of paper in proper position on said member.

8. A loose sheet tablet, consisting of a pile of loose sheets of paper, and a box that incases said sheets when the tablet is not in use, said box comprising a lower part provided with means that holds the sheets in superimposed relation and prevents them from moving horizontally in any direction off the bottom of the box without obstructing the hand or wrist of the person writing on the top sheet of the pile.

9. A device of the kind described, comprising a box that is adapted to hold loose sheets of writing paper, a portion of the rim of said box being removed at one side and at one end of the box so as to provide a space for the hand or wrist of the person writing on the paper in said box, and a lid or cover for the box.

10. A device of the kind described, comprising a box provided with a lid or cover, said box having a bottom that is adapted to support a pile of loose sheets of paper, and means on said bottom that holds said sheets in proper superimposed relation and prevents them from moving horizontally in any direction off said bottom without offering an obstruction to the hand or wrist of the person writing on the top sheet of the pile.

In testimony whereof, I hereunto affix my signature this 19th day of August, 1916.

WILLIAM STUART MATTHEWS.

Copies of this patent may be obtained for five cents each, by addressing the "Commissioner of Patents, Washington, D. C."